(12) United States Patent
Bourchard et al.

(10) Patent No.: US 8,162,199 B2
(45) Date of Patent: Apr. 24, 2012

(54) MOLD SHAVE APPARATUS AND INJECTION MOLDED SOLDERING PROCESS

(75) Inventors: Eric E. Bourchard, Canton de Granby (CA); Guy Brouillette, Shefford (CA); David H. Danovitch, Canton de Granby (CA); Peter A. Gruber, Mohegan Lake, NY (US); Jean-Luc Landreville, Canton de Granby (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/539,893

(22) Filed: Aug. 12, 2009

(65) Prior Publication Data

US 2009/0294090 A1 Dec. 3, 2009

Related U.S. Application Data

(62) Division of application No. 11/619,197, filed on Jan. 3, 2007.

(51) Int. Cl.
*B23K 3/00* (2006.01)
*B41F 15/44* (2006.01)

(52) U.S. Cl. ............ 228/21; 228/22; 101/123; 101/124; 101/129

(58) Field of Classification Search ............... 228/21, 228/22; 101/123, 124, 129
See application file for complete search history.

(56) References Cited

U.S. PATENT DOCUMENTS

| | | | |
|---|---|---|---|
| 5,531,020 A | 7/1996 | Durand et al. | |
| 5,988,856 A | 11/1999 | Braunstein et al. | |
| 6,011,629 A * | 1/2000 | Ootake et al. | 356/400 |
| 6,112,656 A * | 9/2000 | Asai et al. | 101/123 |
| 6,425,515 B2 | 7/2002 | Mays et al. | |
| 6,715,415 B2 | 4/2004 | Yamasaki et al. | |

* cited by examiner

*Primary Examiner* — Jessica L Ward
*Assistant Examiner* — Erin Saad
(74) *Attorney, Agent, or Firm* — Scully, Scott, Murphy & Presser, P.C.

(57) ABSTRACT

An apparatus for the removal of excess solder or contaminant, which are encountered on the surfaces of injection mold prior to the transfer of a solder on a silicon wafer. More particularly, there is provided an apparatus for the removal of excess solder, which may be present on a mold surface, without removing any solder, which is located in cavities formed in the mold, and wherein the solder is applied through an injection molded soldering process.

4 Claims, 1 Drawing Sheet

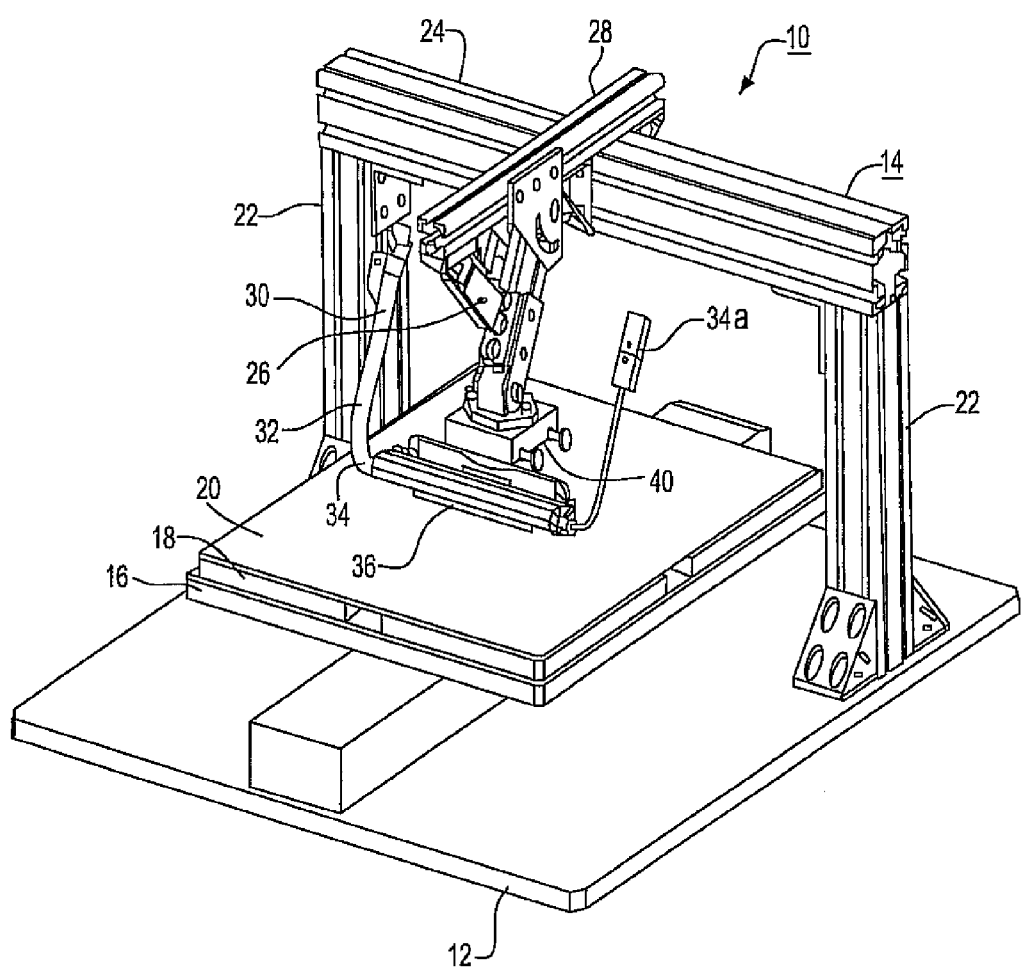

MOLD SHAVE APPARATUS AND INJECTION MOLDED SOLDERING PROCESS

CROSS REFERENCE TO RELATED PATENT APPLICATION

This application is a divisional of U.S. Ser. No. 11/619,197, filed on Jan. 3, 2007.

BACKGROUND OF THE INVENTION

Field of the Invention

The present invention relates to an apparatus and to a method for the removal of excess solder or contaminant which are encountered on the surfaces of injection mold prior to the transfer of a solder on a silicon wafer. More particularly, the present invention is directed to the removal of excess solder, which may be present on a mold surface, without removing any solder, which is located in cavities formed in the mold, and wherein the solder is applied through an injection molded soldering process.

During the application of quantities of molten solder over the surface of a mold plate possessing cavities which are adapted to be filled with the molten solder, wherein the cavities represent wafer controlled collapse chip connecting (C4) pad locations, quite frequently the surface of the mold is subject to some degree of solder streaking; in essence, the formation of fine solder lines, which remain on the mold surface during the dispensing. Moreover, also encountered during the application of the molten solder to the mold surface is the phenomenon of solder bridging which, in entails the formation of an undesired solder connection between two or more of the cavities which are located in the mold surface during solidification and cooling of the molten solder. The process comprises the use of solder and the encountered presence of oxidants and/or contaminants, on the mold surface, which must be removed therefrom prior to the transfer of the solder on a silicon wafer. In particular, during a scanning operation, the solder in the cavities is solidified, whereby, as indicated hereinbefore, the surface of the mold may be subject to some degrees of solder streaking, bridging or the potential presence of other types of contaminants. Consequently, the surface of the mold must be shaved in order to remove such excess amounts of solder, and other contaminants, while concurrently avoiding any undesired removal of solder from the cavities into which the solder has been filled. Also necessary to the process is an aspect that the mold whose cavities have been filled with solder are capable of being visually inspected as to the sufficiency of the mold filling process.

SUMMARY OF THE INVENTION

Accordingly, in order to afford the foregoing appropriate filling of the mold cavities with molten solder, the present invention must be able to remove any and all excess solder, which is present on the mold surface in the absence of removing any solder which has been filled into the mold cavities, while also being capable of removing all oxidants and contaminants from the mold surface. Moreover, it is also an important aspect to be able to facilitate a visual inspection of the mold surface so as to be able to correct any residual defects, which are encountered subsequent to detection and removal of mold surface defects.

Generally, in the current technology, which is concerned with the process of injection molding, it is readily acknowledged that some amounts of solder or alloys cannot be removed at room temperature without concurrently causing the removal of some solder which is filled in the mold cavities. To the contrary, pursuant to another encountered situation, various of the solder-filled cavities also incorporate excess amounts of solder at the upper or infill ends thereof, essentially producing a raised cone-like structure, whereby this excess solder must be removed in order to satisfy the solder volume requirements desired by the mold cavity design.

In order to be able to attain the foregoing, an apparatus and process pursuant to the invention is provided which facilitates removal of solder bridges, streakings and raised solder portions, without adversely affecting or removing the quantities of solder which have already solidified in the mold cavities and which are required for producing the (C4) connections. Various types of solder may also possess a weaker degree of adherence to the wall surfaces in the mold cavities, and the light pressure, which is normally needed to remove the solder bridging, streaking and contaminants from the surface of the mold may, at times, be enough so as to result in the formation of either empty or inadequately filled mold cavities, thereby adversely affecting the integrity of any electronic devices that incorporate the particular wafer or semiconductor structures formed therefrom.

Other problems encountered in the technology are that some solders are naturally harder, for example, such as solders containing high amounts of tin (Sn) for providing a lead-free structure, whereby these high tin solders cannot be easily removed by means of a shaving blade or removal instrument at room temperature, and wherein the cutting edge force acting on the solder streaks or bridges may exceed the adherence of the solder to some of the cavities provided in the mold.

Moreover, it is also necessary to provide for visual inspection of the mold for missing solder quantities in the cavities, whereby the bridging and streaking phenomenon encountered may, at times, produce inappropriate false positive results emanating from typical vision systems. Moreover, oxidants and contaminants on the mold surface must also be removed utilizing a shaving tool prior to the transfer of the solder to a wafer.

In order to achieve the desired results, the present invention provides for a novel apparatus and method of removing such unwanted and deleterious solder amounts or streaks and bridges from the surface of the molds, while concurrently enabling the desired quantities of solder to be filled into and to remain in the mold cavities, the latter of which may be in excess of 100,000 to over 1,000,000 for each mold. Hereby, in this connection, the cavities which are to be filled with the molten solder comprise small holes which have been etched to approximately 0.006 inches in diameter by 0.003 inches in depth which, when filled, form to a precise volume of (C4) bumps which are to be transferred to the wafer pads.

Subsequent to effecting the foregoing process, the solder is aligned in the mold cavities with pads on the wafer, and the assembly heated to reflow temperature, and the solder transferred from the mold plate cavities to metalized pads on the wafer.

In order to attain the foregoing, pursuant to the present invention, there is provided a unique apparatus which will facilitate the shaving of excess solder volumes from the surface of the mold without in any manner adversely affecting the solder volume which has already been filled into the mold cavities, by heating a shaving blade and mold plate.

In essence, the known injection molded solder transfer process cannot allow for the acceptance of large variations in solder bump volumes, and, consequently, by utilizing the inventive shaving apparatus and method, the excess volume of solder, which could adversely affect the solder bumps and also form any bridging or solder excess is removed without damage being sustained by the solder volumes contained in the respective cavities. This shaving action can also be implemented prior to inspection on all molds, even in the absence of any adverse bridging or defects, inasmuch as the inventive method and apparatus is inexpensive and rapid in operation, thereby eliminating costly inspection errors and reducing any necessary rework.

BRIEF DESCRIPTION OF THE DRAWINGS

Reference may now be made to the following detailed description of a preferred embodiment of an apparatus for effecting the shaving of excess solder on molds, particular those utilizing injection molding soldering processes, with reference to the accompanying single FIGURE of drawing showing, in a perspective representation, an apparatus pursuant to the present invention.

DETAILED DESCRIPTION OF THE INVENTION

Referring to the shaving apparatus 10, there is disclosed a plate-like bottom support member 12 that has an upright bridge frame structure 14 beneath which there is located a movable table 16 adapted to be displaced in both x and y directions along the bottom support member 12 through the operation of a suitable operating and conveying structure (not shown).

Supported on the movable table 16 is a vacuum table 18, which enables the retention thereon of a large-sized mold plate 20 with a surface having a multiplicity of cavities or small holes (not shown) formed therein; each of which is adapted to be filled with a quantity of molten solder possessed of a precise volume of (C4) bumps, which are to be transferred to suitable wafer pads (not shown). As indicated, the mold plate 20 may be constituted of a borosilicate glass plate having the cavities etched therein, which represent the wafer (C4) pad locations and with cavity quantities ranging of from 100,000 to an excess of 1,000,000 across the mold plate surface thereof in conformance with the required pad locations.

Suspended from the upright structure, which is in the form of the bridge frame structure 14 having uprights 22 and a transverse beam member 24 connecting the uprights 22, is a depending cylinder 26 connected to a cross-beam 28, and is adapted to be displaced in a vertical or z-motion by being pivotably hinged to the cross-beam. Attached to one upright 22 is a further pivotable unit 30 in the form of a depending arm 32 and transverse member 34, including a counterweight 34a, which comprises a nitrogen heater for imparting a predetermined amount of heat to a shaving blade 36 extending transversely at the lower end of unit 30 across the surface of the mold plate 20 and which may be in slidable contact with the surface of the cavity-containing mold, the latter of which can be moved in x and y directions through displacement of the x-y movable table 16. The shaving blade 36, which, as mentioned, is located at the bottom of unit 30 so as to extend transversely across the surface of the mold, is constituted of an extremely sharp and flexible material, which is heated to a temperature above the melting point of the alloy, which is to be shaved, and which forms the solder. The blade angle is adapted to be adjusted to appropriate shaving angles utilizing a 360°-rotary plate 40, which is attached to the lower end of the z-motion cylinder 26 and which facilitates a rotary or angular motion of the shaving blade 36 during its travel over the surface of the mold plate 20.

In essence, the shaving blade 36 is maintained under an adjustable pressure, which is imparted to the arm 32 supporting the shaving blade relative to the surface of the mold, and is displaced slowly over the mold surface. Upon contacting any excess solder or streaking or bridging quantities thereof which are present on the mold plate surface, the solder which is present in the cavities has been softened without melting, and by utilizing an appropriate blade speed, the shaving blade 36 will remove excess solder by scraping in intimate contact along the surface of the mold plate 20 without removing any solder that has been previously filled into the cavities.

The speed of the blade motion and the consistencies of the material forming the blade cutting or shaving edge must be adapted to different types of solders and hardnesses, inasmuch as the properties of such solder alloys typically remain constant over a period of time, an adjustment of the blade cutting edge and speed is only required on seldom occasions. For example, a suitable blade material may be an ASME 1095 tool steel; however, other cutting blade materials, such as zirconia or stainless steel are also deemed to be acceptable for this purpose. Furthermore, it is also possible to impart a heating action to the mold plate 20 whereby the combination of the heated blade and heated mold plate raises the solder temperature of harder lead free alloys to a point at which the solder alloy softens considerably. This significantly reduces the possibility of removing solder from the cavities during the scraping or shaving removal of excess solder from the surface of the mold.

Subsequently, after having removed the excess solder from the mold surface through being scraped off by the heated blade, it is then possible to align the solder which is present in the mold cavities, with pads on a wafer (not shown), whereby the assembly is then heated to reflow temperature and the solder transferred from the mold plate cavities to metalized pads located on the wafer.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but to fall within the spirit and scope of the appended claims.

What is claimed is:

1. An apparatus for shaving excess solder from the surface of a mold plate containing a multiplicity of cavities each filled with a volume of solder, said apparatus comprising:

a flat plate-shaped support member, a movable horizontally extending table mounted on said support member, an operative mechanism connected to said table for imparting a horizontally selective displacement to said table in x-y directions;

a vacuum table being supported on an upper surface of said moveable table, a flat mold plate having a multiplicity of cavities formed in an upper surface thereof for filling with solder material being mounted on said upper surface of said vacuum table;

a bridge-shaped frame comprising a pair of spaced vertically extending uprights and a transverse beam member connecting the upper ends of said uprights mounted on said support member, said frame extending over and having the transverse beam member straddling said mold plate in spaced vertical relationship therewith, the lower ends of said uprights being respectively fastened proximate opposite edges on the surface of said support member;

a cross beam adjustably coupled to said transverse beam member, said cross beam extending substantially perpendicularly from said transverse beam member;

a heating device having a depending arm and counterweight pivotably on said frame suspended from said transverse beam member for pivotal motion relative thereto, said heating device having a heatable shaving blade that is attached to a lower end of the arm of said heating device for displacement in surface contact across the upper surface of said mold plate;

said heating device being constituted of a nitrogen heater for heating said shaving blade to a temperature softening the solder in said cavities in the absence of melting while scraping excess solder from the surface of said mold plate during movement in surface contact therewith;

a cylinder movable in a z-direction connected to, respectively, said bridge-shaped frame via being coupled to said cross beam and to an operative structure having a rotary plate attached thereto for imparting rotational movement to said shaving blade, whereby said shaving blade is contactingly movable across the upper surface of said mold plate to facilitate scraping any protruding excess softened solder from the cavities thereof, and wherein said cylinder enables said operative structure to impart a control over speed of movement, variations in the cutting edge of said shaving blade, and temperature control over said shaving blade in correlation with the selected type of material and composition of the solder;

wherein said counterweight and said depending arm are substantially parallel and are coupled to and extend upward from opposite terminal ends of the shaving blade.

2. An apparatus as claimed in claim 1, wherein said heating device selectively imparts heat to said mold plate concurrently with the heating of said shaving blade to facilitate removal of said softened excess solder, oxidants and contaminants from the surface of said mold plate in dependence upon specific properties of the solder being shaved from the surface of the mold plate.

3. An apparatus as claimed in claim 1, wherein the shaving blade is selected from the group of materials consisting of ASME 1095 tool steel, zirconia and stainless steel.

4. An apparatus as claimed in claim 1, wherein the heatable shaving blade, the counterweight, and the depending arm, geometrically together, generally form a U-shape.

* * * * *